United States Patent [19]

Paulus et al.

[11] Patent Number: 5,898,407
[45] Date of Patent: Apr. 27, 1999

[54] MOTOR VEHICLE WITH ANTENNA WINDOW WITH IMPROVED RADIATION AND RECEPTION CHARACTERISTICS

[75] Inventors: Peter Paulus, Münster; Detlef Baranski, Recklinghausen; Hans-Jürgen Niklewski, Bochum; Helmut Piorek, Gladbeck, all of Germany

[73] Assignee: Flachglas Automotive GmbH, Witten, Germany

[21] Appl. No.: 08/707,111

[22] Filed: Sep. 3, 1996

[30] Foreign Application Priority Data

Sep. 2, 1995 [DE] Germany .............. 195 32 431

[51] Int. Cl.$^6$ .............................................. H01Q 1/32
[52] U.S. Cl. .............................. 343/713; 343/767
[58] Field of Search .............................. 343/713, 712, 343/711, 704, 767, 770, 769; H01Q 1/32

[56] References Cited

U.S. PATENT DOCUMENTS

| | | | |
|---|---|---|---|
| 5,012,255 | 4/1991 | Becker | 343/713 |
| 5,177,494 | 1/1993 | Dorrie et al. | 343/713 |
| 5,355,144 | 10/1994 | Walton . | |
| 5,451,966 | 9/1995 | Du et al. | 343/713 |
| 5,646,637 | 7/1997 | Miller | 343/713 |

FOREIGN PATENT DOCUMENTS

| | | |
|---|---|---|
| 0 332 898 | 9/1989 | European Pat. Off. . |
| 37 43 099 | 6/1990 | Germany . |

*Primary Examiner*—Don Wong
*Assistant Examiner*—Tho Phan
*Attorney, Agent, or Firm*—Herbert Dubno

[57] ABSTRACT

A motor vehicle, especially a passenger vehicle, has a metallic body provided with a window opening receiving an antenna window. The antenna window has inner and outer panes bonded together by a bonding layer with an optically-transparent electrically-conductive solar central coating reducing transmission in at least a part of the solar energy range. At least one edge of the window is left free from the coating and in this region a slot antenna is formed. At least at one additional edge, the coating runs to that edge and is overlapped by the framing portion of the vehicle body and is coupled with a high-frequency coupling to the coating.

20 Claims, 7 Drawing Sheets

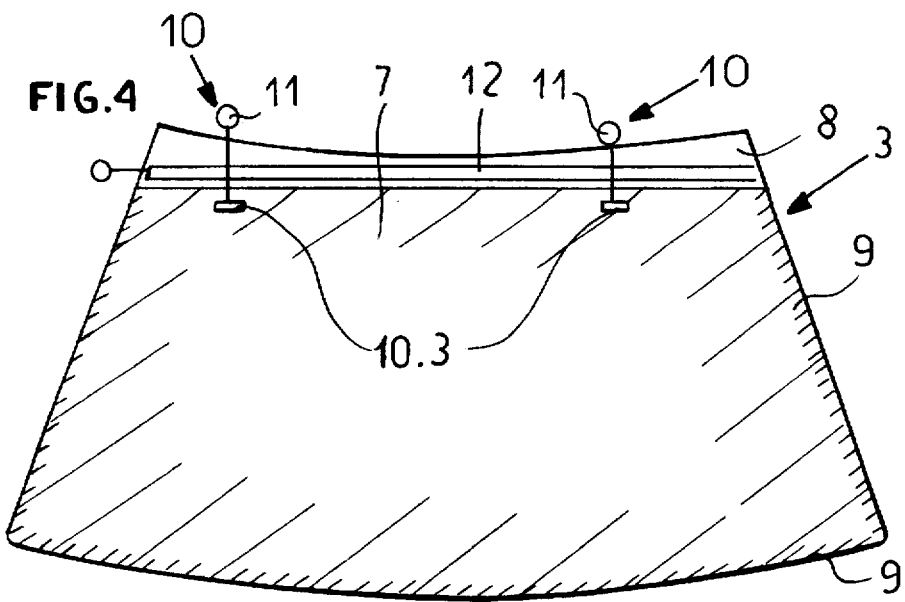
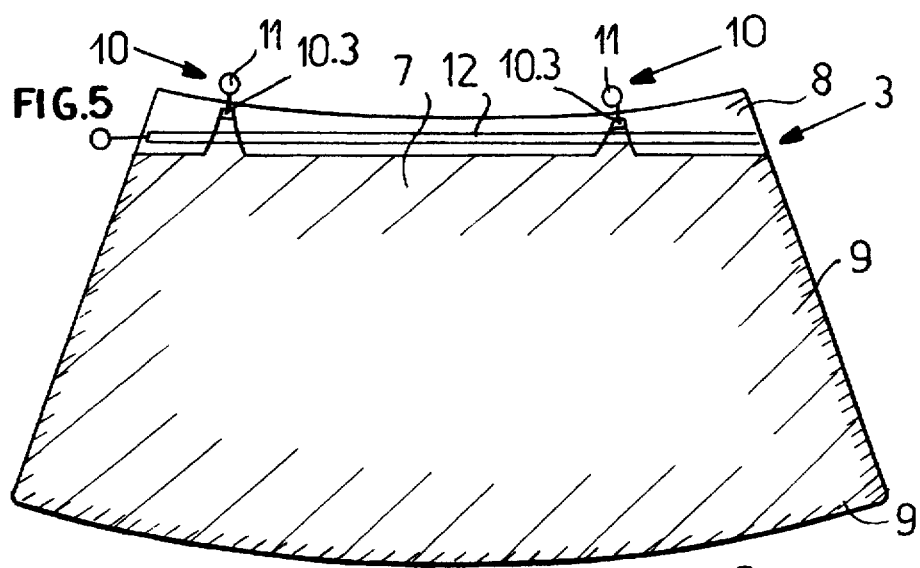
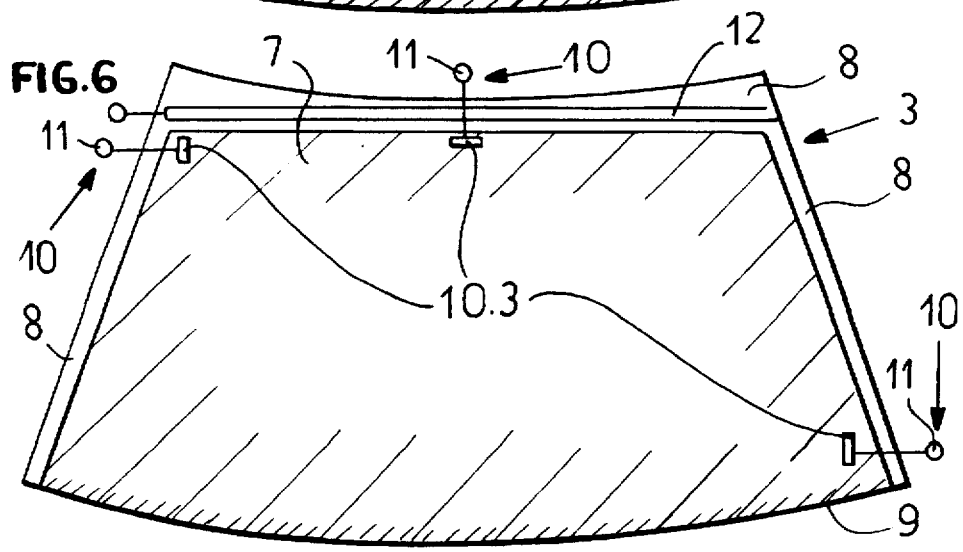

MOTOR VEHICLE WITH ANTENNA WINDOW WITH IMPROVED RADIATION AND RECEPTION CHARACTERISTICS

FIELD OF THE INVENTION

Our present invention relates to a motor vehicle, especially a passenger-type automobile having at least one window opening in its body surrounded by a metal frame and in which an antenna window is disposed.

BACKGROUND OF THE INVENTION

Antenna windows of modern automotive vehicles must satisfy the extreme requirements for the reception and transmission of electromagnetic waves and, indeed are required to act as broad-band antennas, i.e. antennas which are effective over a wide frequency range for electromagnetic waves of different polarizations. The high requirements pertain not only to energy requirements but also to the geometry of the radiation or reception characteristics.

Typical frequency ranges include long wave, middle wave and shortwave ranges and the usual AM range (150 kHz–30 MHz), the VHF range for radio and television reception (30 MHz to 300 MHz) and the UHF range for television reception, for mobile radio and for satellite communication (global positioning satellite—GPS or the like), and remote control devices (300 MHz–2 GHz).

In practice, antenna windows for automotive vehicles have used antenna elements which have the configuration of wires or are conductors which are screen-printed on a glass pane and are burned into the substrate, or are antenna elements formed from electrically-conductive coatings.

Reference may be made specifically to U.S. Pat. No. 5,355,144 and German Patent 37 43 099. If the antenna pane is a safety glass pane having an inner pane, an outer pane and a bonding layer, for the reception and transmission of radio waves, an optically-transparent electrically-conductive coating can be provided. This conductive coating has, once it has been incorporated into the antenna window, a relatively broad peripheral spacing from the edge of the window opening and thus from the metallic body. As a result the metallic layer is electromagnetically decoupled significantly from the body of the vehicle.

The feed to the antenna window and the coupling of radio waves from the latter is effected with the aid of coaxial cables. Research has shown that the transmission and reception characteristics from an energy point of view as well as from the directional characteristic point of view can be improved. This is especially the case when the antenna pane must be satisfactory for transmission and reception in a broad-band range.

Vehicles are also known in which the window is provided with electrically-conductive solar control coatings, for example coatings of noble metal or semiconductive metal oxide. The solar control coating is either applied directly upon the glass panes assembled to form the window or is provided on a thin transparent foil, for example, of polyethyleneterephthalate (PET) which is bonded with bonding layers with the glass panes, especially between the latter. The aforementioned solar control coatings are customarily applied over the entire window area and thus run to all edges of the window pane.

Vehicles are also known in which the window is provided with electrically-conductive solar control coatings, for example coatings of noble metal or semiconductive metal oxide. The solar control coating is either applied directly upon the glass panes assembled to form the window or is provided on a thin transparent foil, for example, of polyethyleneterephthalate (PET) which is bonded with bonding layers with the glass panes, especially between the latter. The aforementioned solar control coatings are customarily applied over the entire window area and thus run to all edges of the window pane.

The solar control coating, in the context of the present invention is intended to refer to all electrically-conductive coatings which can reduce solar energy transmission in at least a partial region of the solar spectrum. Usually the reduction is in the visible and infrared ranges.

For vehicles which have windows with such solar control coatings, it has been difficult, if not impossible, to provide antenna windows with good reception and/or transmission quality over a broad band, without noticeable detriment to the solar control effectiveness or damage to the optical characteristics.

OBJECTS OF THE INVENTION

It is, therefore, the principal object of the present invention to provide a motor vehicle of the type described with improved transmission and reception of electric magnetic waves over a broad waveband as well as with reference to the geometry of the antenna characteristic, i.e. reception or transmission characteristic.

It is another object of he invention to improve the transmission and reception characteristics in a simple manner and with simple means to allow industrial serial or mass production without difficulty.

It is another object of the invention to provide an antenna window for a motor vehicle which will have both good solar control characteristics and reflection/transmission characteristics which is of high quality.

SUMMARY OF THE INVENTION

These objects and others which will become apparent hereinafter are attained, in accordance with the invention in an automotive vehicle which comprises:

a vehicle body formed with a window opening framed by a metallic border;

an antenna window in the opening and secured to the body, the antenna window comprising:
  an inner pane,
  an outer pane,
  a bonding layer between the inner pane and the outer pane, and
  an electrically conductive optically transparent solar control coating capable of reducing solar energy from transmission in at least one portion of the solar energy spectrum, the solar control coating being set back from at least one edge of the window opening to define along the edge a strip-like slot region, the solar control coating running to at least one other edge of the antenna window and being overlapped by the metallic border at the at least one other edge and being high-frequency-coupled to the metallic body at the at least one other edge; and means forming in the slot region a slot antenna.

The vehicle is thus characterized by the following features:

1.1 The antenna pane comprises an inner pane, an outer pane, a bonding layer between two panes and securing them both together and an optically-transparent electrically-conductive solar control coating which can be on a foil disposed in the bonding layer or a layer system applied to one of the inner surfaces of the glass pane.

1.2 In the region of at least one edge of the antenna window, the solar control coating is set back from and defines with a corresponding edge of the window opening, a strip-like slot region.

1.3 At least on one of the edges of the antenna window, the solar control coating runs to the edge of the antenna pane and overlaps the corresponding edge region of the window opening.

Because of the overlapping of an edge region of the window opening and the solar control coating, a high-frequency conducting path is formed between the solar control coating and the metallic vehicle body. The slot region between the solar control coating and the corresponding edge of the window opening is provided with or serves as a slot antenna in the vehicle body. Slot antennas also known as slot radiators, are well known in high-frequency technology, especially for operation in the aforementioned frequency ranges.

Slot antennas are characterized by a slot of a given length and width in a conducting plane or in a shield which surrounds this slot and can be utilized or excited, either as a receiving antenna or a transmission antenna. The magnetic field of a slot antenna corresponds, for example, to the electrical field of a dipole of corresponding length. The electric field of the slot antenna corresponds to the magnetic field of a dipole.

Slot antennas are coupled via coaxial cable for feed of the high-frequency energy to the slot antenna or from the slot antenna to the receiving circuitry with inner or core conductor and the outer or shield conductor at opposite points of the slit with the surrounding conducting shield.

This definition of a slot antenna also applies in the case of the invention, bearing in mind that the one edge of the slit or slot is formed by the edge of the window opening whereas the other edge of the slit or slot is being formed by the edge of the solar control coating which is set back from the edge of the window opening or by a high-frequency analogous configuration of the solar control coating or an analogous structure on the solar control coating. The latter elements also define the slot antenna in the sense of the invention and the slot region can have different configurations as developed further below.

The term "overlap" as used here is intended to indicate that the margin of the solar control coating extends within a projection of the margin of the vehicle body defining the opening perpendicular to the antenna window whether the margin of the opening lies above or below (or inwardly or outwardly of) the antenna window.

The slot region according to the invention is preferably a region without solar control coating although it with a coating which has a reduced high-frequency conductivity and which is applied by any conventional means, the high-frequency conductivity of which having been reduced by a mechanical, chemical or radiation treatment.

While the slot region is preferably located in the vicinity of the upper edge of the antenna window, it can also be provided, if desired, along the lateral edges or along the lower edge. The antenna window is usually a safety glass comprised of two glass panes and the bonding foil or layer between them.

The term "antenna window" is thus used in accordance with this disclosure to refer to a window structure having an outer glass pane, the bonding foil and the inner glass pane.

The inner pane may, if desired, be replaced by a plastic pane or even a plastic foil.

The solar energy absorber, as has already been noted, can be provided at any optional location between the inner surface of the outer glass pane and the inner surface of the inner pane and can be a glass coating or a coated foil. It should have a resistance per unit area (specific resistance) of several ohms to significantly less than 100 ohms per centimeter square. The slot antenna in its simplest form, is provided at only one edge of the pane, preferably at the upper edge although, when further slot regions are provided, these can be formed with L-shaped or U-shaped slot antennae.

From a fabrication point of view, it has been found to be advantageous to form the slot region across the entire length of the edge of the pane along which is provided. However, the length of the slot region can be shorter than that of the edge of the antenna window. While the slot region is preferably symmetrical with respect to the center of the antenna window, it may also be asymmetrical with respect to the central axis of the antenna window.

According to the invention, a small conductive edge strip can be provided as the edge boundary of the slot region and which can overlap the edge of the window opening and thereby form a virtual ground conductor.

Vehicle windows which can be formed with slot antenna are known (e.g. EP 0 332 898 B1). The slot is formed in the metal layer provided with collecting bars and runs, when the window is built into the vehicle, horizontally or from an upper part to a lower part in the middle of the window. Coaxial conductors are used here for coupling to the antenna. Optionally a peripheral spacing is provided between the metallic coating and the edge of the window opening or a window frame or the body of the vehicle. The arrangement of slots in the viewing region of the vehicle window is aesthetically unsatisfactory and alters the optical characteristic of the window from location to location on the window and thus complicates viewing through the window.

Coupling to the antenna is complicated. The slot antenna formed in this system has a closed frame configuration. By contrast, the slot antenna of the invention lies close to the edge of the window opening while the solar control coating is coupled with the body of the vehicle with high frequency coupling, i.e. a capacitative and/or inductive coupling which does not exclude a galvanic coupling with a certain contact resistance. The slot region itself is a region of no high-frequency conductivity or whose high-frequency conductivity is sufficiently reduced to permit the slot antenna effect to prevail in this region.

According to the invention, therefore, a solar control coating defines a slot region with a strip configuration and is in high-frequency connection with the body. The body of the vehicle forms part of the electromagnetic system of the antenna. At least at one edge the antenna slot is provided while elsewhere the overlapping of the body portion defining the window opening and the window are coupled together to define the boundary conditions for the field within the window formed by the solar control coating, in the vehicle body and in the slot region where the electromagnetic characteristics are determined by Maxwells equations. These boundary conditions influence reception of the electromagnetic waves and their emission.

It has been found that the strip-like slot region forms a slot antenna with especially good reception characteristic in the VHF range. The reception characteristic at higher frequency and in the AM range can be improved by providing in the slot region at least one flat strip or linear antenna element, for example, in the form of a monopole or dipole dimensioned for the respective frequency range.

It is indeed surprising that the slot antenna and such additional individual antennas or antenna elements can be combined without problems and without detrimental effects of the one on the other.

In the region of the antenna window there is a complex impedance matrix which influences its reception and transmission characteristic and its radiation pattern. By adjustment of the width and length of the slot region and by the use of additional antenna elements in this region, the antenna function-of the antenna window can be optimized without detriment to the solar control characteristics or the reflection/transmission optical characteristics in a significant manner.

The strip-like slot region can be covered by an electrically-nonconducting opaque screen printed strip or the like as is the case with modern vehicle windows along the edges thereof. Alternatively a foil can be bonded to the window and can correspond to a standard color wedge, e.g. a gray wedge or a green wedge.

According to a preferred embodiment of the invention, the bonding layer between the inner and outer panes can be comprised of a first bonding foil a foil with an electrically conductive, especially metallic, solar control coating layer, and a second bonding foil. The foil with the solar control coating can be cut shorter than the bonding foils so that its edge forms the edge of the solar control coating and terminates at a spacing from the corresponding edge of the vehicle body to define therewith the slot region. The bonding foils are of the usual material utilized in safety glass.

Typical bonding foils are composed of polyvinylbutyral (PVB) or EVA and, where the solar control coating is on a respective foil, that foil can be composed of a polyethyleneterephthalate. The width of the slot region, i.e. the distance between the edge of the solar energy absorber and the edge of the window opening along the corresponding side of the antenna pane, is 3 mm to 200 mm, most preferably about 60 mm. The length of the slot region should be at least 400 mm and preferably the slot region is disposed symmetrically with respect to the center of the window opening.

The slot region can extend from one lateral edge of the antenna window to the other, i.e. all along a respective side of the latter and can have different spacings from the edge of the body of the vehicle framing the window opening.

The solar energy absorber can extend to three of the four edges of the antenna window and can be overlapped by the margins of the window opening along these three sides. The invention, however, also includes a configuration in which the solar energy absorber is set back from the upper and lower edges of the window openings or can extend to the edges of the window in these regions while being set back along the lateral edges to provide strip-like slot regions there. One of the upper and lower slot regions can extend into a lateral slot region if desired.

Along the slot region, a plurality of coupling elements can be provided for coupling radio frequency waves out of the antenna. The antenna window can form part of a diversity system and can be connected to a diversity circuit.

The coupling element can be a flat electrode capacitively coupled to the antenna system and disposed along the edge of the slot region to overlap the solar control coating. The coaxial cable can have its outer sheath grounded to the body of the vehicle and its core wire connected to a respective coupling element.

Directly adjoining or proximal to the coupling location, an amplifier which is grounded to the vehicle body can be provided. The coupling element can cross with one or more conductive members of the slot region. Furthermore, the coupling device can include one or more strip-like or linear conductors running to or from the solar control coating.

Depending upon the frequency and the vehicle dimensions, the antenna window can be provided with a single coupling unit, preferably located at the longitudinal center of the slot region. The antenna window can, however, have two or more coupling devices which are spaced apart along the slot region. The slot geometry and location or locations of the coupling or couplings serve to determine the sending and transmitting properties and the spatial sending and transmission characteristic while with capacitive feed or tapping of the output from the antenna window, the dimensioning of the electrode area enables impedance matching.

An AM antenna can additionally be provided in the slot region and can extend over at least part of the length of the latter. Additional antenna elements for VHF frequencies and UHF frequencies can also be provided in the slot region. These antenna elements, apart from any which may possibly be provided with virtual ground conductors do not overlap either with the vehicle body or with the solar energy absorber since such overlap would be detrimental to the transmission and reception characteristics of the antenna system.

In a preferred embodiment of the invention, the slot antenna or slot antennas are designed to transmit or receive primarily in the frequency range of about 50 to 300 MHz while the additional antenna elements are provided for frequencies in the range of 300 MHz to 2 GHz. It will be understood that with small antenna windows, for example, with triangular side windows, the frequency ranges are correspondingly shifted. The feed or outcoupling from the slot antenna and the additional antenna elements can be effected through a common coupling unit for reducing the coupling cost. However, it is possible for each antenna to have a separate coupling unit.

The antenna window can additionally have a heating field connected to a direct current source which, in the visible region is electrically insulated from the solar energy absorber.

BRIEF DESCRIPTION OF THE DRAWING

The above and other objects, features, and advantages will become more readily apparent from the following description, reference being made to the accompanying drawing in which:

FIG. 4 is a view similar to FIG. 2 but showing additional AM antenna conductors and heating conductors for defrosting and de-icing of the windshield;

FIG. 5 is a view similar to FIG. 4 illustrating another embodiment of the invention;

FIG. 6 is a view similar to FIG. 4 of still another embodiment of the invention;

SPECIFIC DESCRIPTION

Figure 1:
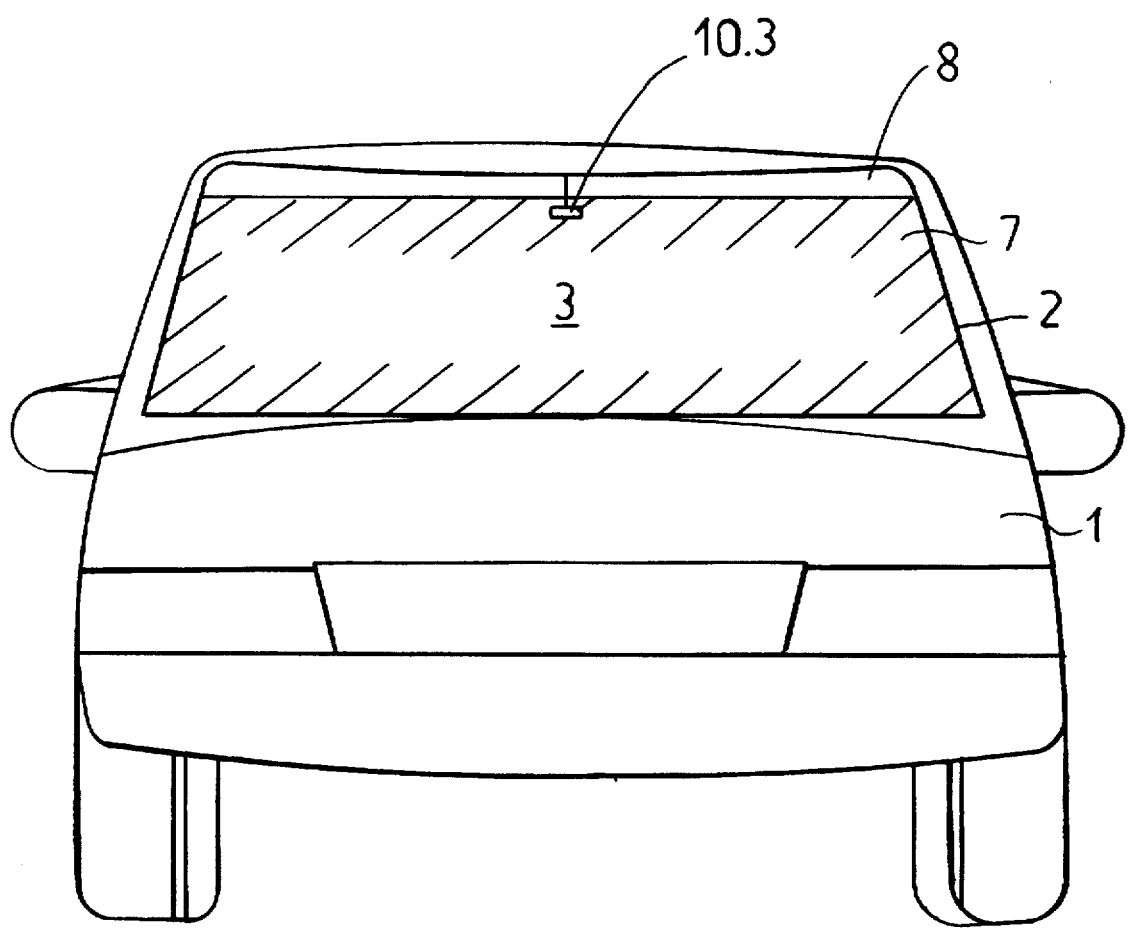
FIG. 1 is a front view of a passenger motor vehicle having a windshield formed as an antenna window.

The vehicle shown in FIG. 1 is a passenger-type automobile with a metallic body 2 and a window opening 2 which can be at the front or rear of the vehicle body 1 and in the illustrated case has an opening for the windshield. A windshield has been formed as an antenna window, fills this opening.

Figure 2:
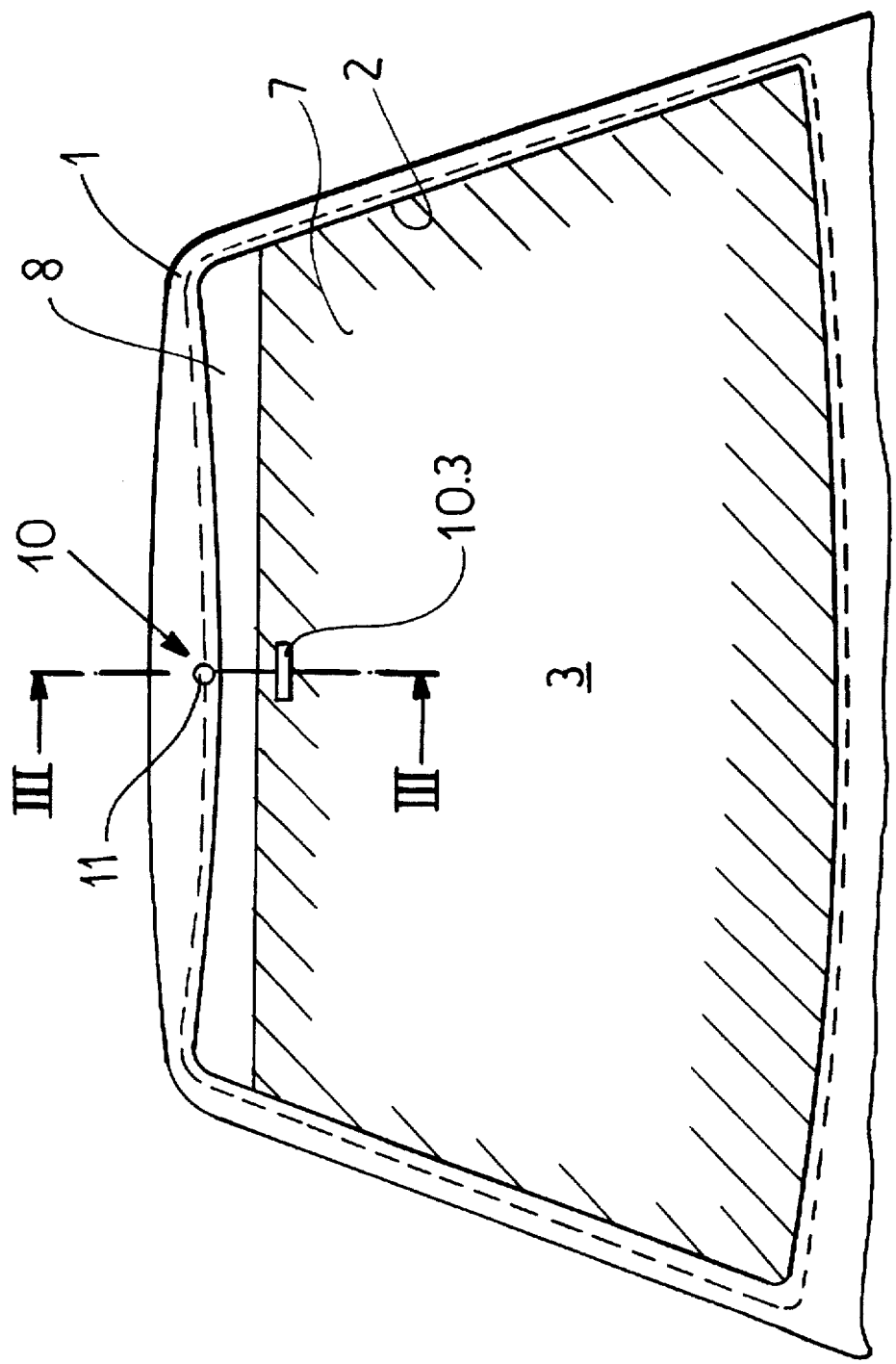
FIG. 2 is a diagrammatic elevational view, drawn to a larger scale than FIG. 1 of an antenna window formed as a windshield for a vehicle like that of FIG. 1.

As can be seen from FIG. 2, the window opening is defined by boundary parts of the vehicle body. The region in which the antenna window 3 overlaps the boundary of the window opening formed by the body has been represented by the broken line in FIG. 2. In FIGS. 4–9, the boundary portions of the body in the region of the window opening are no longer illustrated although it will be understood that the window opening is thus bounded by portions of the metallic vehicle body framing the window opening.

Figure 3:
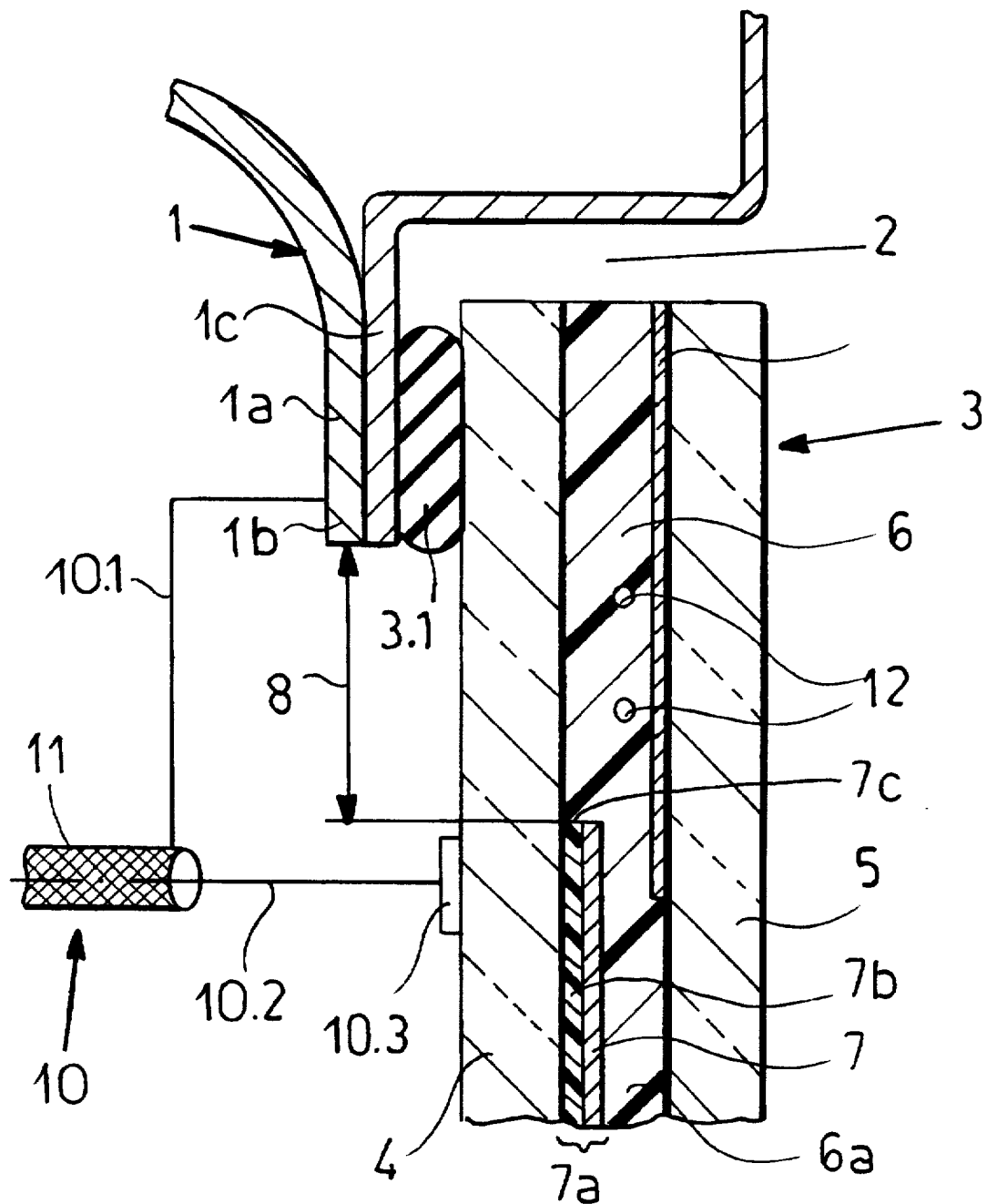
FIG. 3 is a cross sectional view taken along the line III—III of FIG. 2 but enlarged to a greater extent.

From FIG. 3 a portion of this frame can be seen at 1a formed by two flanges 1b and 1c and the metallic body 1. The antenna window 3 is a safety-glass window formed from an inner glass pane 4 and an outer glass pane 5 spaced from the inner glass pane and connected thereto by a bonding layer as is conventional with laminated safety glass.

In addition, the safety glass pane is provided with solar ray protection, i.e. a layer which removes from the light passing through the window at least a portion of the solar light spectrum, e.g. the UV component. That layer is, in the embodiment shown, a foil of a metal coating 7 which is transparent and electrically conductive. In the alternative, the latter may be provided directly on one of the surfaces of one of the panes 3, 4, but in the embodiment of FIG. 3, the foil with the solar control coating 7 is shown embedded in the plastic bonding layer 6.

The invention, of course, is not limited to vehicles with safety glass panes.

The antenna window 3 is seated in the window opening 2 with the aid of an adhesive or mastic mass 3.1. At the edge of the outer glass pane 5, an opaque screen printed border 5.1 is provided. Between the edge of the window opening 2 and the edge of the foil with the solar control coating 7 which is electrically conductive, a slot region 8 is provided in which two AM antenna conductors 12 are disposed, these wires being seen in section in FIG. 3. The coaxial cable 10 running to the transmitter or receiver or an amplifier, has its shield 11 connected via a conductor 10.1 with the metal body 1 of the vehicle and thus is grounded to the vehicle body. The core 10.2 of the coaxial cable 10 is provided with a feed or coupling electrode 10.3 affixed to the inner glass pane 4 for radio frequency coupling to the foil 7.

From a comparison of FIGS. 1 and 2 as well as from the further Figures here, it can be seen that in the region of the upper edge of the antenna window 3 there is between the solar control coating 7 and the upper edge of the window opening an uncoated strip-like slot region 8. Apart from this slot region 8, the solar control coating 7 runs to the edge of the antenna pane so that it is correspondingly overlapped by the vehicle body 1.

Figure 7:
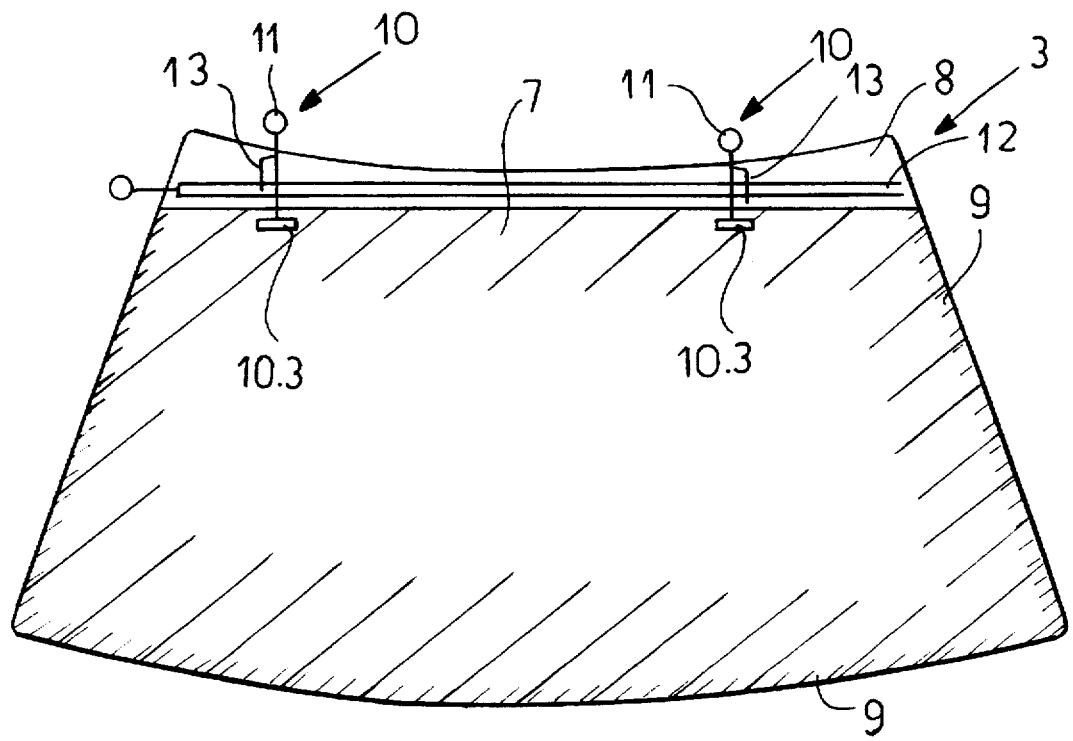
FIG. 7 is a view similar to FIG. 4 of an embodiment with additional antenna elements.
Figure 8:
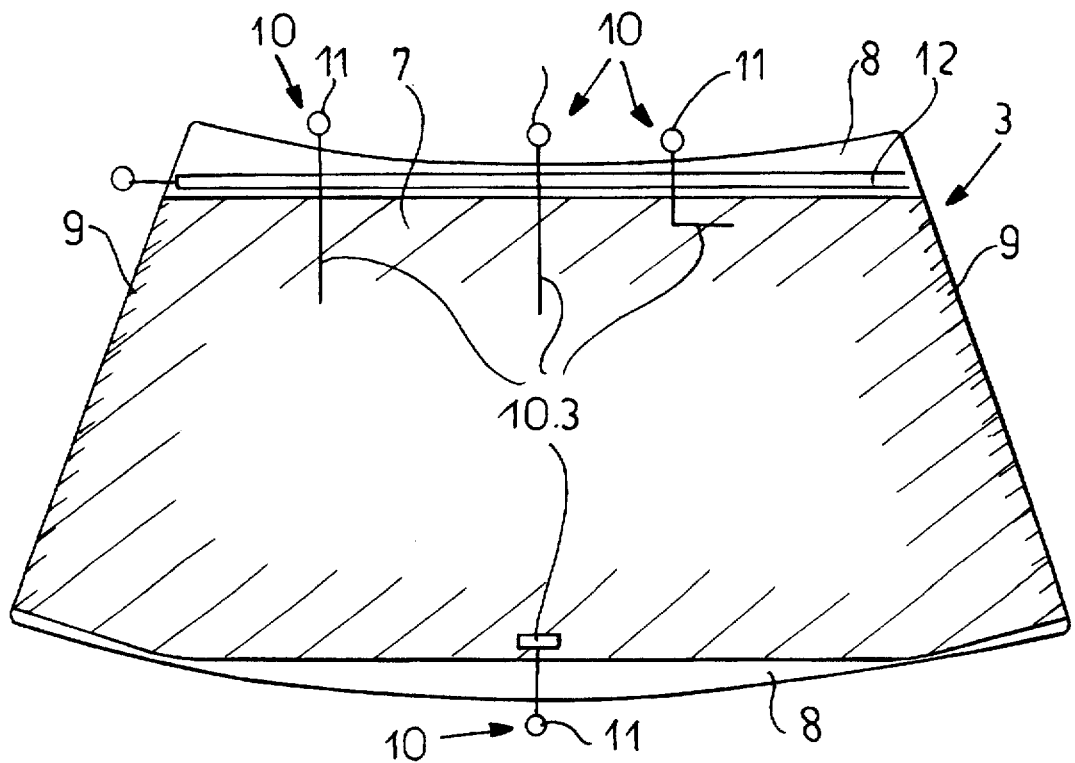
FIG. 8 is a view similar to FIG. 4 of still a further embodiment.
Figure 9:
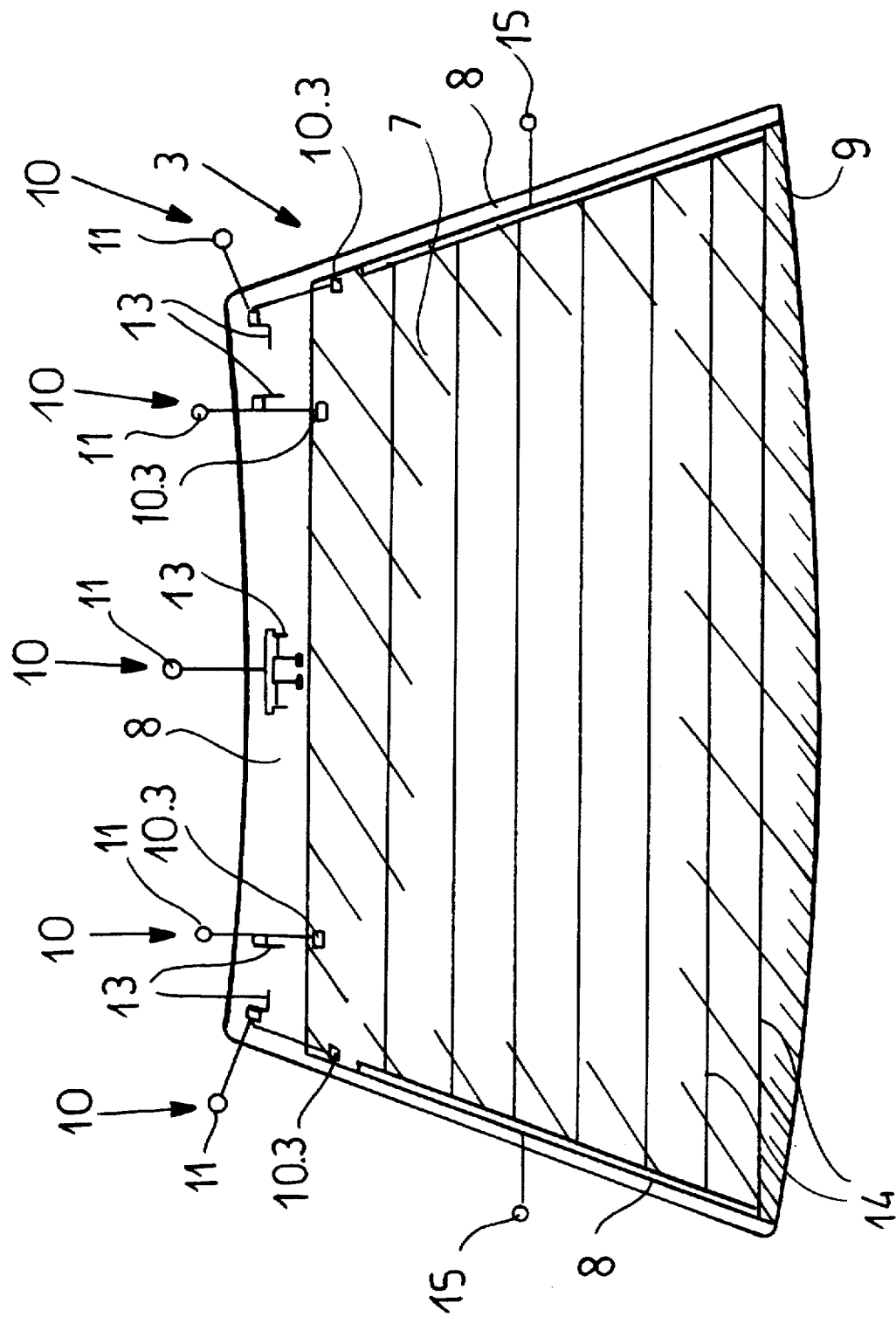
FIG. 9 is a view similar to FIG. 4 of a more complex configuration of a window antenna.

The overlap region 9 has been shown in FIGS. 4–9 by hatching. In FIGS. 1–5 and 7, the solar control coating 7 runs to all other edges of the antenna window apart form the upper edge and overlaps the corresponding regions of the window opening 2. In FIGS. 6, 8 and 9, additional slot regions 8 are provided on fewer than all of the lateral edges or the lower edge of the pane. The feeding of high-frequency to or the coupling of high frequency from the conductive layer 7 can also be effected on the short sides of the antenna pane.

In all of the embodiments there is a high-frequency conductive connection between the edge region of the window opening and the control coating 7 overlapped thereby. The slot region 8 between the solar absorber 7 and the edge of the window opening 2 forms a slot antenna in the motor vehicle body 1.

The antenna pane 3 is, in the embodiment of FIGS. 1–3 configured in an especially preferred manner in that the bonding layer 6 is formed of a first bonding foil, a foil with the electrically conductive and preferably metallic solar control coating 7 and a second bonding foil. The region 8 can be provided by cutting off a corresponding portion of the solar-absorbing foil of the foil with the solar control coating. The slot region can have a width of 3 mm to 200 mm, preferably about 60 mm. The width may have been exaggerated in the drawing for better illustration. The slot region 8 can extend, in the embodiment described, from one side of the antenna pane 3 to the opposite side. It should have a length of at least 400 mm and is preferably symmetrical with respect to the center of the window opening. When a very broad range is possible in the width of the slot regions, a strip-like solar control coating can be included in this region, preferably integrated with the AM antenna conductors but not illustrated.

From FIG. 3 it will be apparent that the solar control coating 7 forms part of a foil 7a which is bonded to the glass panes 3, 4 by a first bonding foil 7b and a second bonding foil 6a. The foil 7a is cut short at an edge 7c to define the slot region 8 previously described.

From FIGS. 6, 8 and 9, it will be apparent that other regions such as the lower edge or one or both of the side edges of the antenna window 3 may have the solar control coating 7 set back from the corresponding edge of the window opening to define a further slot region 8 which also can form the slot antenna or form part of the slot antenna of the vehicle. However, the solar control coating 7 must run to at least one edge of the antenna window 3 and at this at least one edge, must be overlapped by a framing portion of the metallic vehicle body 1 and coupled thereto with a high-frequency coupling.

Returning to FIG. 3 and, of course, the other Figures where equivalent elements are identified with the same reference numerals, it can be seen that a capacitative coupling element or device 10.3 is provided for coupling radio frequency energy from this antenna window depending upon whether the antenna window is used for transmission or reception purposes.

The coupling element 10.3, which is connected to the external circuitry by the shield cable 10 in the manner previously described, can overlap the solar control coating 7 directly adjacent the slot region 8. Thus this coupling element can lie within a projection of the solar control coating 7 perpendicular to the arrow 8 to the left in the illustration of FIG. 3.

In the embodiment of FIG. 1, the slot antenna circuit utilizes a single coupling element 10.3 for coupling radio frequency into the antenna window and out of the latter. In this case, the coupling element 10.3 is located in the longitudinal center of the slot region 8. In the embodiments of FIGS. 4–9, a plurality of coupling elements 10.3 can be provided in each embodiment and can be distributed over the length of the slot region 8 in accordance with the receiving or transmitting frequency range. By appropriate distribution of a plurality of such coupling devices, the transmitting and reception characteristics of the antenna in space can be positively influenced. The coupling devices can be flat so as to extend two-dimensionally, i.e. over an area of the antenna window as is the case is all of the embodiments so that the exception of that of FIG. 8, or can be linear as illustrated in FIG. 8.

As can be seen from FIGS. 4–8 moreover, in the slot region 8 along the upper edge of the antenna window, an additional AM antenna of conventional construction can be provided. The AM antenna 12 can extend over the entire length of the slot regions 8 or only over a portion thereof.

From FIGS. 7 and 9 it may be seen, further, that in the slot region 8 additional antenna elements 13 for high-frequency radio waves can be additionally provided. These can include the antenna elements 13 at the upper corners of the antenna window which are particularly suitable for television reception in the very high-frequency range as well as multi-frequency mobile radio antenna elements as shown at the center of the antenna window and connected to a virtual ground.

The solar control coating 7 can additionally be provided itself as a heating field which is connected to a direct current source, e.g. via the terminals 15 or the antenna window 3 can be provided with additional heating elements 14 which can be spaced from the conductive solar energy absorber and can be connected via terminals 15 with the direct-current source. The heating fields formed by the wires 14 or by the solar energy absorber 7 itself can serve for defrosting and de-icing of the windshield.

FIGS. 1–10 show coating 7 as a single layer. It can also represent one of a plurality of fields into which the coating is subdivided to provide simultaneously a plurality of antennas at least one of which, but preferably all of which are characterized by the features of the present invention.

Figure 10:
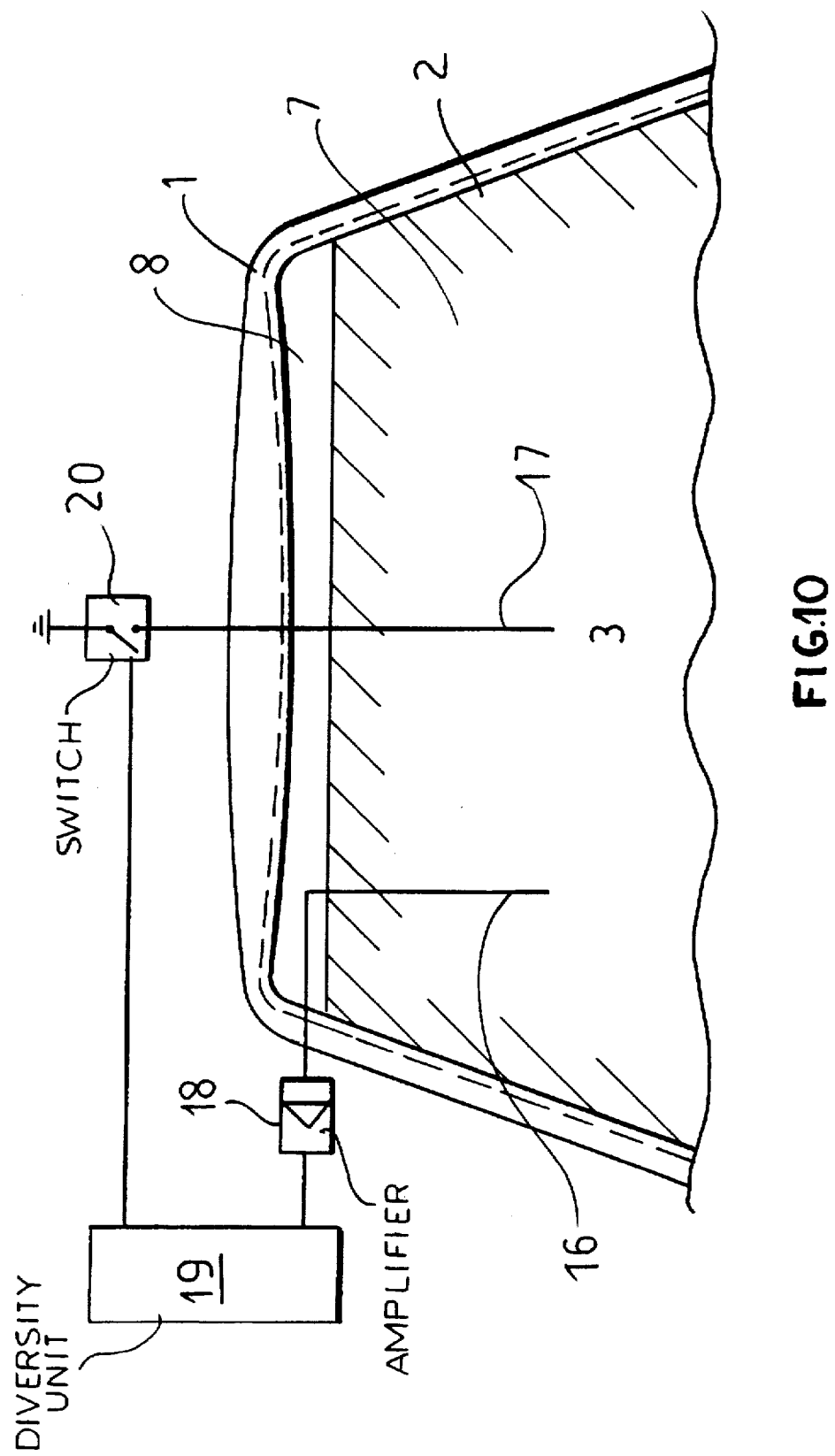
FIG. 10 is a view similar to FIG. 2 but which in contrast to the system of FIG. 2 shows a parametric diversity system according to the invention.

It has been found to be highly advantageous to provide the antenna window 3 as part of a diversity system and, in particular, part of a parametric diversity system as shown generally in FIG. 10 for the windshield of FIG. 2. In other words the windshield of FIG. 10 illustrates only the additional elements required for the parametric diversity system, the balance of the windshield corresponding to that of FIG. 2.

From FIG. 10 we can see the L-shaped antenna 16 on the left side and a parasitic radiating element 17 located at the center of the windshield. The L-shaped antenna 16 is connected to the amplifier 18 which, in turn, is connected to the diversity unit 19 provided with the switch 20 which in turn, is connected to the diversity unit 19 provided with the switch 20 which in one position open-circuits the system and in another position short-circuits the system so that different current applications to the antenna are possible with different directional diagrams.

One can also provide two or more such antennas or two or more such coupling devices. Instead of the switch 20, switching elements controlled by the diversity unit with variable impedance can be provided as well.

We claim:

1. An automotive vehicle comprising:

a vehicle body formed with a window opening framed by a metallic border;

an antenna window in said opening and secured to said body, said antenna window comprising:

an inner pane, an outer pane, a bonding layer between said inner pane and said outer pane, and an electrically conductive optically transparent solar control coating capable of reducing solar energy transmission in at least one portion of the solar energy spectrum, said solar control coating being set back from at least one edge of said window opening to define along said edge a coating-free strip-like slot region, said solar control coating running to at least one other edge of said antenna window and overlapping said metallic border at said at least one other edge and being high-frequency-coupled to said metallic border at said at least one other edge; and means for electrically contacting said solar control coating and said one edge of said window opening adjacent to the coating free strip-like slot region whereby a slot antenna is formed.

2. The automotive vehicle defined in claim 1 wherein said bonding layer is a foil laminate of a first bonding foil, a foil provided with said electrically conductive optically transparent solar control coating and a second bonding foil, said foil with said control coating being cut shorter than said second bonding foil.

3. The automotive vehicle defined in claim 1 wherein said slot region has a width of 3 mm to 200 mm.

4. The automotive vehicle defined in claim 1 wherein said slot region has a length of at least 400 mm.

5. The automotive vehicle defined in claim 1 wherein said slot region is symmetrical with respect to a center of said window opening.

6. The automotive vehicle defined in claim 1 wherein said slot region extends from one side of the antenna window to an opposite side thereof.

7. The automotive vehicle defined in claim 1 wherein said solar control coating extends to edges of said antenna window on all sides thereof except from an upper side of said antenna window.

8. The automotive vehicle defined in claim 1 wherein said slot region is formed at an upper side of said antenna window, a lower side of said antenna window being formed with another slot region provided with a further slot antenna.

9. The automotive vehicle defined in claim 1, further comprising a capacitive coupling element on said antenna window for coupling radio frequency energy into and out of said antenna window and overlapping said solar control coating adjacent said slot region.

10. The automotive vehicle defined in claim 9 wherein said coupling element crosses with at least one conductor at said slot region.

11. The automotive vehicle defined in claim 1, further comprising a single coupling element on said antenna window for coupling radio frequency energy into and out of said antenna window and located in a region of a center of length of said slot region.

12. The automotive vehicle defined in claim 1, further comprising a plurality of coupling elements on said antenna window for coupling radio frequency energy into and out of said antenna window and spaced apart along the length of said slot region.

13. The automotive vehicle defined in claim 1, further comprising an AM antenna disposed in said slot region and extending over at least part of the length thereof.

14. The automotive vehicle defined in claim 1, further comprising additional antenna elements disposed in said slot region and connected for transmission and reception of high frequency waves for at least one of mobile radio, television and global positioning satellite communications.

15. The automotive vehicle defined in claim 14 wherein said slot antenna is configured for a frequency range of about 50 to 300 MHz and said additional antenna elements are configured for a frequency range of about 300 MHz to 2 GHz.

16. The automotive vehicle defined in claim 1, further comprising means for connecting at least part of said electrically conductive optically transparent solar control coating to a source of direct current for electrically heating said antenna window for defrosting and deicing thereof.

17. The automotive vehicle defined in claim 1, further comprising heating conductors in said antenna window spaced from said electrically conductive optically transparent solar control coating and forming a heating field for electrically heating said antenna window for defrosting and deicing thereof.

18. The automotive vehicle defined in claim 1 wherein said antenna window is so connected as to form part of a diversity system.

19. The automotive vehicle defined in claim 18 wherein said antenna window is provided with a plurality of variable impedance coupling elements connected for transmission and reception of high frequency waves and forming with the antenna window part of a parametric diversity system.

20. The automotive vehicle defined in claim 1 wherein said electrically conductive optically transparent solar control coating is subdivided into a plurality of fields, at least one of said fields being formed and connected as a slot antenna.

* * * * *